July 15, 1924.

W. D. KMENTT 1,501,492

METAL INSERT FEEDING MACHINE

Filed Aug. 30, 1921   2 Sheets-Sheet 1

Inventor
Waldemar D. Kmentt.
By Robert M. Pierson
Atty.

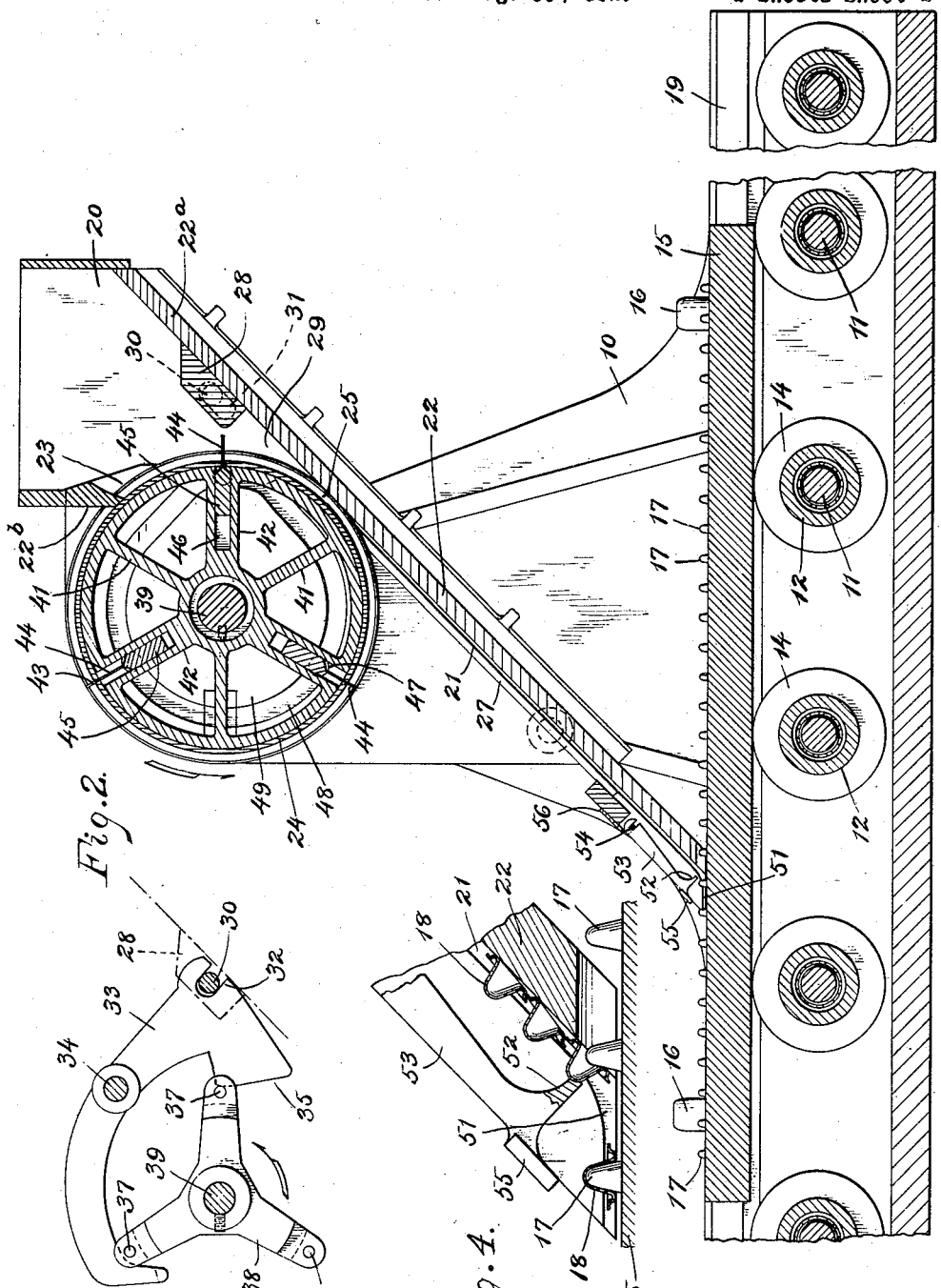

Patented July 15, 1924.  1,501,492

UNITED STATES PATENT OFFICE.

WALDEMAR D. KMENTT, OF AKRON, OHIO, ASSIGNOR TO THE B. F. GOODRICH COMPANY, OF NEW YORK, N. Y., A CORPORATION OF NEW YORK.

METAL-INSERT-FEEDING MACHINE.

Application filed August 30, 1921. Serial No. 497,054.

*To all whom it may concern:*

Be it known that I, WALDEMAR D. KMENTT, a citizen of the United States, residing at Akron, in the county of Summit and State of Ohio, have invented a certain new and useful Metal-Insert-Feeding Machine, of which the following is a specification.

This invention relates to means for automatically feeding from a hopper small cup-shaped or cap-like metal pieces such as inserts for rubber packings for pneumatic tire inflation valve closures, or any analogous article, and automatically loading or placing them upon individual holders such as the pins of a multiple-compartment mold in which the inserts are to be covered with rubber.

My principal objects are to provide a hopper mechanism which will avoid the clogging of the outlet and will regularly feed the individual pieces into a delivery chute or chutes, and to provide a simple and reliably-acting means for locating the individual inserts upon the mold pins or equivalent receiving structure.

Of the accompanying drawings:

Fig. 2 is a transverse section on the line 2—2 of Fig. 1.

Fig. 3 is a section on the line 3—3 of Fig. 1, showing the mechanism for operating the hopper gate.

Fig. 4 is a transverse, vertical section on a larger scale, illustrating the operation of the parts concerned in placing the inserts on the mold pins.

Figure 1:
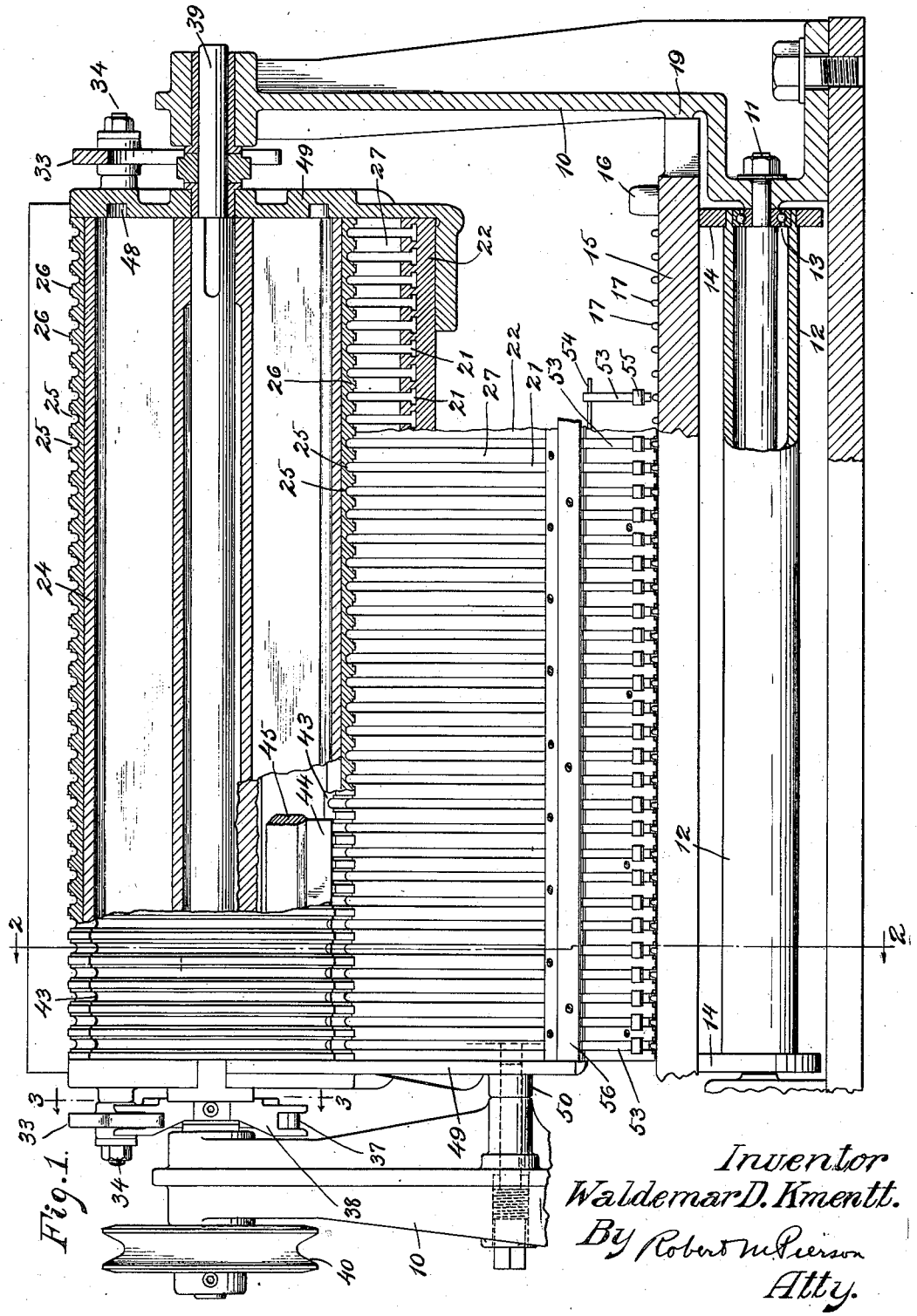
Fig. 1 is a front elevation, partly broken away and in section, showing a machine constructed according to my invention.

In the drawings, 10 is the machine frame at the base of which are located a series of parallel horizontal shafts 11, 11, surrounded by a series of tubular roller bodies 12, 12, which turn on ball bearings 13, and which have roller flanges 14, 14 at their ends for supporting the lower plate 15 of a multiple-compartment vulcanizing mold in which the rubber packing discs are formed and cured. 16, 16 are dowels for registering the mold parts and 17, 17 are a multiplicity of conical, round-pointed pins inserted in straight, parallel rows in the plate 15 for supporting the flanged, cup-shaped, metal inserts 18, shown in Fig. 4.

The frame 10 is formed with parallel guides 19 between which the mold plate 15 slides for keeping the rows of pins on said plate accurately registered with the lower ends of the feed chutes. The plate 15 is moved over the rollers 14 in any suitable way, preferably by hand.

20 is a hopper or magazine located at the upper end of the frame 10, into which the pieces 18 are placed in bulk or in miscellaneous positions, and 21 21 are a series of inclined, parallel, undercut guide tracks or chutes corresponding in number to, and registering at their lower ends with, the rows of mold pins 17, and formed in a plate 22 constituting a continuation of the bottom plate 22$^a$ of the hopper 20. While such integral connection of the hopper and chute bases is not essential, the chute should be permanently associated with the hopper in the sense that the presence of both is necessary to the cooperative action of the hopper with the means provided for automatically removing the articles from the lower end of the chute as above and hereinafter described.

The front wall 22$^b$ of the hopper is formed with a large opening 23 which is closed, except for a series of narrow feed openings, by a rotary drum 24, whose periphery is formed with a series of parallel circumferential outlet grooves 25 registering with the upper ends of the chutes 21 and separated by shallow, annular projections or flanges 26 which register with the raised ribs 27 between said chutes. The front wall 22$^b$ of the hopper is scalloped on its lower edge to interfit with the grooves of the drum and dam the opening 23.

On the inclined bottom of the hopper 20 is slidingly mounted a bar 28 extending transversely across the full width of the hopper and constituting a gate which controls the access of the pieces 18 to the feeding space 29 at the lower end of the hopper. The ends of this gate bar are provided with studs 30 passing through slots 31 in the side walls of the hopper and each engaged at its outer end by the sides of a notch 32 in one arm of a lever 33, which is fulcrumed at 34 on the side of the hopper. The two arms of this lever are provided with pallet faces 35, 36, successively engaged by the pins 37 on a three-armed cam spider 38, which is attached to the drum shaft 39. Said shaft carries a pulley 40 for turning it and rotating the cam spider and the drum. The action of the cam pins 37 upon the pallet faces of the lever 33 results in raising or retracting the gate bar 28 along the bottom wall of the hopper to the position shown in Fig. 3, and immediately thereafter depressing or projecting it to the lower extreme of its movement, following which there is a dwell in the lower position until the next pin 37 reaches the pallet face 35.

The body of the drum 24 is formed with radial webs or spokes 41, 42, whereby its peripheral portion is connected with its hub portion on the shaft 39, and the periphery of said drum is longitudinally slotted throughout its length at 43, 43, at three equidistant points, to form guide apertures or slots through which are radially reciprocated a series of three blades or paddles 44 attached to bars 45 which are mounted in guide-ways 46 formed in the thicker spokes 42. The ends of these bars are provided with studs 47, occupying a pair of similar cam grooves 48 in a pair of plates 49 which form end closures for the hollow drum 24 and are connected at 50 with the side standards of the frame 10, as indicated in Fig. 1, to hold said plates from rotating.

The major portion of each cam groove 48 is made approximately circular and with its center slightly below that of the shaft 39, in order to hold the blades 44 retracted within the periphery of the drum while they are passing the dam 22$^b$ and during the first portion of their circuit outside of the hopper 20, and gradually to project each blade until its outer edge is approximately even with the outer periphery of the drum when it reaches the outlet position. The minor portion of said groove adjacent to the front of the hopper is radially extended to project each blade successively in an upward or backward sweep in the hopper, the direction of rotation of the drum being counter-clockwise, as indicated by the arrow in Fig. 2.

The undercut side portions 51 of the feed chutes 21, which guide the flange portions of the inserts 18, turn from an inclined to a horizontal position at the lower or delivery ends of said chutes, as indicated in Figs. 2 and 4, and at the angle or bend where the inserts change direction and are picked off by the mold pins 17 there is located, over each chute, the nose portion 52 of an aumatic, gravity-latch or gate 53 having a slotted upper end which hangs upon a pivot-rod 54 common to the several members 53, each of said members also having a stop portion 55 at its lower end, projecting laterally over and adapted to abut the two adjacent ribs 27, and being retained against escape from the pivot-rod 54 by a detachable plate 56 common to said members.

In the operation of this machine, the cup-shaped, metal insert pieces 18 are loaded in bulk into the hopper 20 and are fed therefrom individually in rows into the guide chutes 21 by gravity from the lower end of the hopper under the joint control of the gate bar 28 and the blades 44. The blades 44 act as lifters for the pieces 18 in the feeding space 29 at the mouth of the hopper, which prevent the pieces in said space from becoming packed or jammed by the superincumbent weight of the mass in the upper part of the hopper, the action of the cam grooves 48 being such as gradually to project the blades on entering the hopper and cause their edges at first to describe a path substantially parallel with the bottom plate of the hopper. The frictional contact of the upwardly-moving portion of the drum periphery upon the articles in the hopper exposed thereto also contributes to the back-sweeping action and assists in turning into a feeding position those which have congregated at the outlets. As each blade 44 during its upsweep comes adjacent to the gate bar 28, the latter is retracted, as shown in Fig. 2, in order to permit the passage of said blade, and as soon as the latter gets past the bar said bar is immediately depressed into the space 29, in order to limit the size of the free opening into which the pieces 18 are allowed to descend. Thus there will be only a small surplus of pieces in the feeding space 29 at any one time, and these will readily find their way into the feeding channels formed between the bottom plate of the hopper and the walls of the grooves 25 in the drum 24, and from thence into the chutes 21. The pieces 18 are automatically fed into the grooves with their flanged bases downward, since all that do not at first present themselves in that posture cannot enter said grooves and will eventually be turned into such posture by the agitating action of the drum and its paddles.

The pieces form in slanting stacks or rows, generally with a slight overlap as indicated in Fig. 4, and on reaching the lower end of the chute are arrested by the gate or latch 53, so that the foremost one is in a position to be picked off by one of the pins 17. A mold plate 15 to be loaded with metal inserts is introduced at the back of the machine and pushed forward until the front pin 17 in each of its rows comes under the lower-most insert 18 in the corresponding feed chute 21. A continuation of the forward movement of the mold plate causes the inserts to be successively picked off by the pins, and the mold plate is thereby very rapidly loaded. A fresh plate may follow immediately after and be used to push the loaded or partly loaded plate ahead, and so on. The drum 24 is continuously rotated, and since the hopper has an impositive gravity feed, the inserts will be supplied to the chutes only as rapidly as they are taken away at their lower ends, the action of the paddles 44 serving to limit the height of the stack in each chute and hence to limit the weight pressing upon the latch gates 53.

Various modifications may be made without departing from my invention.

I claim:

1. In a machine of the character described, the combination of a hopper for holding small articles in bulk and having a sloping floor, a gravity chute leading therefrom and having a floor sloping in continuation of that of said hopper, and a rotary, back-sweeping member constituting in effect a side wall of said hopper, the upper end portion of said chute being substantially tangent to said rotary member and the two at the point of tangency being so formed as to define a passage of such form in cross-section of the structure as to accommodate an article of determinate form and size only when said article is in a determinate position, said chute having its mouth substantially at said point of tangency.

2. In a machine of the character described, the combination of a hopper for holding the articles in bulk and having a sloping floor, a gravity chute leading therefrom and formed with an undercut guide groove having a floor sloping in continuation of that of said hopper, and a rotary, back-sweeping member constituting in effect a side wall of said hopper, the upper end portion of said chute being substantially tangent to said rotary member, and the two at the point of tangency being so formed as to define a passage of such form in cross-section of the structure as to accommodate an article of determinate form and size only when said article is in a determinate position, said chute having its mouth substantially at said point of tangency.

3. In a machine of the character described the combination of a feed hopper having a sloping floor, a gravity chute leading therefrom and having a floor sloping in continuation of that of said hopper, and a rotary, back-sweeping member constituting in effect a side wall of said hopper, the upper end portion of said chute being substantially tangent to said rotary member and the two at the point of tangency being so formed as to define an outlet passage of determinate cross-section approximating the form of the work, a substantial portion of the cross-section of said passage being represented by a recession of the periphery of said rotary member.

4. In a machine of the character described, the combination of a feed hopper having a sloping floor, a gravity chute leading therefrom and having a floor sloping in continuation of that of said hopper, and a rigid, rotary, back-sweeping member constituting in effect a side wall of said hopper, the upper end portion of said chute being substantially tangent to said rotary member and the two at the point of tangency being so formed as to define an outlet passage of determinate cross-section approximating the form of the work, a substantial portion of the cross-section of said passage being represented by a circumferential groove in said rotary member.

5. In a machine of the character described, a feed hopper having a sloping floor, a chute leading from said hopper and having a floor sloping in continuation of that of said hopper, a back-sweeping member, and means for causing said member periodically so to sweep backward from the mouth of said chute over the floor of the hopper that the portion of said member adjacent said floor moves from the mouth of said chute in a direction approximately parallel with the floor of said hopper.

6. In a machine of the character described, a feed chute, a hopper having an opening, a rotary drum forming a closure for said opening and having a radially-movable blade operative on the contents of said hopper, to control the supply of articles therefrom to said chute, and means for automatically projecting and retracting said blade.

7. In a machine for feeding small articles, the combination of a chute, a gate at the delivery end of said chute, positive means for stopping said gate in position to engage with the lowermost article in said chute, said gate being adapted automatically to be opened by the withdrawal of the lowermost article from the chute, yielding means for holding said gate against said stopping means, means for withdrawing articles from the lower end of said chute, and means for supplying articles to said chute to a determinate maximum length of column.

8. In a machine for feeding small articles, a feed chute, a hopper, a rotary drum having a circumferential groove forming an outlet from said hopper, a series of blades radially movable to positions within and without the periphery of said drum, and stationary cam mechanism for projecting and retracting said blades.

9. In a machine for feeding small articles, a feed chute, a hopper having an opening, a rotary drum forming a closure for said opening and having a radially movable blade, means for rotating said drum in a direction counter to the feeding movement from the hopper, and means for projecting said blade beyond the periphery of the drum while within the hopper and retracting it within said periphery on passing out of the hopper.

10. In a machine for feeding small articles, a feed hopper, a chute leading therefrom, and gate means in said hopper above the mouth of said chute adapted normally to support a supply of articles in said hopper and adapted periodically to be so opened as to permit a part only of said supply to fall into the lower part of the hopper, adjacent the mouth of said chute, and means in said lower part of the hopper for causing the articles so dropped to assemble in order in said chute.

11. In a machine for feeding small articles, a feed hopper having a sloping floor, a chute leading therefrom and having a floor sloping in continuation of that of said hopper, a back-sweeping member at the mouth of said chute, and means for periodically dropping a supply of said articles on the floor of said hopper adjacent the mouth of said chute.

12. In a machine for feeding small articles, a feed chute, a hopper having an outlet to said chute at its lower end, a backwardly-rotating grooved drum partly forming said outlet and provided with an automatic, radially-movable paddle operative within the hopper and a reciprocatory gate within the hopper coacting with said paddle to control the access of the hopper contents to said outlet.

13. In a machine for feeding small articles, a feed chute having an opening, a backwardly-rotating drum forming a closure for said opening, and having a circumferential groove constituting an outlet from the hopper, a series of radially movable paddles mounted on said drum, means for automatically projecting said paddles beyond the periphery of the drum within the hopper, and a reciprocatory gate within the hopper coacting with said paddles to control the access of the hopper contents to said outlet groove.

14. In a machine for feeding small articles, a feed chute, a hopper having an outlet thereto at its lower end, means for back-sweeping the lower contents of the hopper, a reciprocating gate controlling said lower contents and operating means for said gate adapted to impart thereto a retracting movement immediately followed by a projecting movement and a dwell in the projected position.

15. In a machine for feeding small articles, a series of chutes, a common hopper having outlets to the respective chutes for feeding the articles thereto, and means for preventing packing of the articles in the hopper over said outlets.

16. In a machine for feeding small articles, a series of chutes, a hopper having outlets to the respective chutes, and means common to said outlets and rotating about a horizontal axis for back-sweeping the contents of the hopper over said outlets.

17. In a machine for feeding small articles, a guideway adapted to feed by gravity a row of recessed articles, a gravity-actuated latch, means for stopping said latch in position to engage the lowermost article in the guideway, and a series of pins movable at an acute angle to the delivery end of said guideway for entering the recesses in the articles and successively picking them off from said end.

18. In a machine for feeding small articles, a feed chute, a plate movable in a rectilinear path across the delivery end of said chute and having a series of pins for successively picking off the pieces therefrom, and guiding means open at front and rear for supporting and engaging the edges of a succession of said plates under the chute to be loaded therefrom.

19. In a machine for feeding small articles, an inclined feed chute, a plate movable in a rectilinear path at an acute angle under the delivery end of said chute and having a row of pins adapted successively to pick off the pieces from said chute, guides for said plate open at front and rear for moving a succession of the plates under said chute, and a series of stationarily mounted plate-supporting rollers mounted on axes transverse to the path of movement of the plate.

In witness whereof, I have hereunto set my hand this 25th day of August, 1921.

WALDEMAR D. KMENTT.